United States Patent [19]

Gérard et al.

[11] Patent Number: 4,473,137
[45] Date of Patent: Sep. 25, 1984

[54] DISC BRAKE PAD AND DISC BRAKE FITTED WITH SUCH A PAD

[75] Inventors: Jean-Louis Gérard, Paris; Claude Le Marchand, Domont, both of France

[73] Assignee: Societe Anonyme D.B.A., Paris, France

[21] Appl. No.: 364,827

[22] Filed: Apr. 2, 1982

[30] Foreign Application Priority Data

Apr. 14, 1981 [FR] France .................. 81 07473

[51] Int. Cl.³ ............................................. F16D 65/02
[52] U.S. Cl. ................................................. 188/73.32
[58] Field of Search ............... 188/73.31, 73.32, 73.33, 188/73.39, 73.43

[56] References Cited

U.S. PATENT DOCUMENTS 3,616,879 11/1971 Pauwels ........................ 188/73.33
3,942,612 3/1976 Le Marchand ................... 188/73.6
4,209,083 6/1980 Gerard ......................... 188/73.32

FOREIGN PATENT DOCUMENTS 0002150 12/1979 European Pat. Off. .
2451603 5/1975 Fed. Rep. of Germany ... 188/73.32
2268989 11/1975 France .

Primary Examiner—Duane A. Reger
Attorney, Agent, or Firm—Larry J. Palguta; Paul D. Schoenle; Ken C. Decker

[57] ABSTRACT

The subject of the invention is a disc brake pad and a brake including such a pad.

The disc brake pad (10) comprises two opposite sides (16, 18) including projections (24, 26) in which notches (28, 30) are formed, formed by a first part (32) and a second part (34) forming an acute angle (A) between them. The profile of the opposite sides (16, 18) is such that, for any point (P) of the second part (34), the distance between said point (P) and any part of the opposite side (16, 18), except the region of the notch (28, 30), is greater than a value (R) corresponding to the distance separating the apices of said two notches (28, 30) plus a predetermined value. The required profile of the sides is obtained by means of a portion (44) connecting said second part (34) and the corresponding side (16, 18) of the pad (10). Application to motor vehicle braking.

5 Claims, 3 Drawing Figures

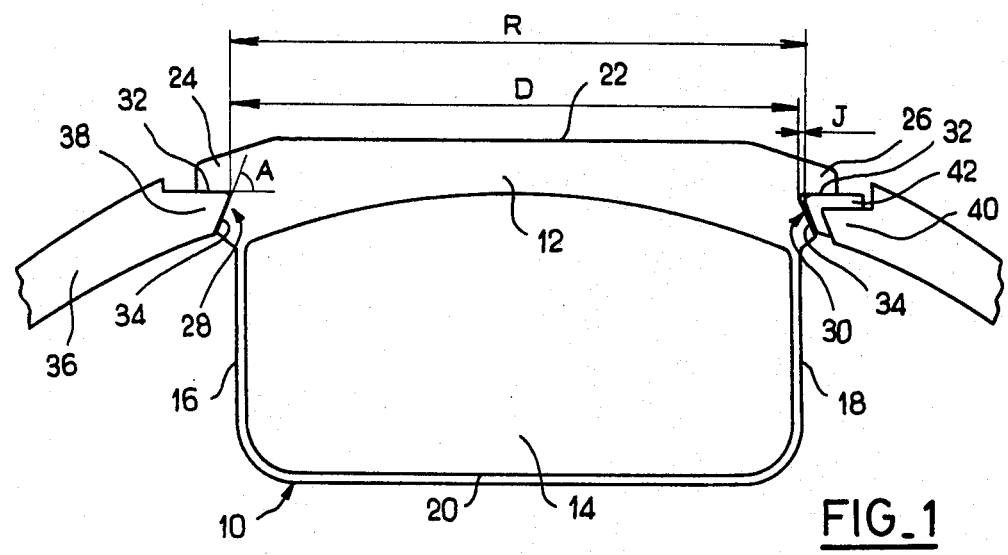
FIG_1
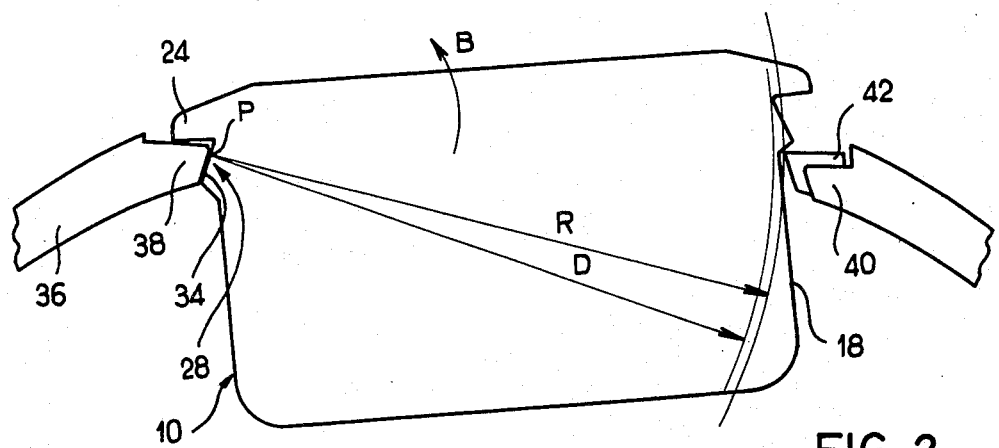
FIG_2
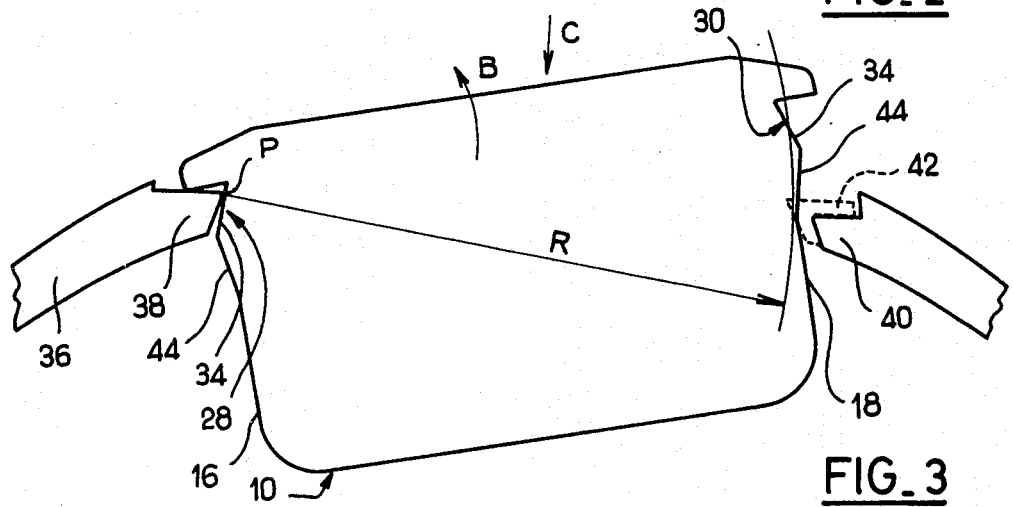
FIG_3

DISC BRAKE PAD AND DISC BRAKE FITTED WITH SUCH A PAD

The invention relates to a disc brake pad capable of being fitted on a motor vehicle, as well as a disc brake including such pads.

It is established that replacing pads on the disc brakes of vehicles is increasingly carried out by unskilled labor. This is mostly due to increasingly high hourly skilled rates. As brakes in general and brake pads in particular are parts which are basic to the safety of the vehicle, it is clearly necessary to define pad-shapes so that it will be impossible, when friction elements are being replaced, for example, for even someone unskilled to fit pads on a brake wrongly. In French patent application No. 77-34537, filed Nov. 17, 1977, and published under the No. 2 409 423, a disc brake pad is represented which could possibly be badly fitted by someone unskilled; in practice, one of the projections of the stirrup for fixing and allowing sliding of the pad is capable of being fitted not in the notch provided for this but in the broken outline formed on the pad-holder and located below the notch.

The object of the invention is to solve this problem.

To this end, the invention relates to a disc brake pad including a pad-holder plate on which a friction pad is fixed, said plate being substantially rectangular in shape and comprising a first pair of substantially parallel sides, circumferentially spaced, and a second pair of substantially parallel sides, radially spaced, each of the sides of the first pair including a notch, a first part of which is substantially parallel to said sides of the first pair and a second part of which forms an acute angle with said first part, characterized in that the profile of said sides of the first pair is such that, for any point describing said second part, the distance between this point and any point on the other side of said first pair, other than the region of the associated notch, is greater than the distance separating the apices of said two notches plus a predetermined value.

The invention thus makes it impossible to fit the pad incorrectly.

The invention also relates to a disc brake including pads and a torque support on which circumferentially spaced projections are formed for fixing and allowing sliding of said pads, characterized in that said projections have a profile conjugate with the profile of said notches, and in that the circumferential distance between the apices of said projections corresponds to the distance separating the apices of said two notches plus a predetermined value.

A particular embodiment of the invention will not be described, by way of non-limiting example, with reference to the attached drawings in which:

FIG. 1 is a front view of a disc brake pad correctly fitted on its torque support;

FIG. 2 is a front view of a disc brake pad fitted incorrectly on its torque support; and FIG. 3 is a front view of a disc brake pad made in conformance with the invention and showing that incorrect fitting of it is impossible.

The disc brake pad represented in FIGS. 1 and 2 referred to as a whole by the reference 10 has a pad-holder 12 on which a friction pad 14 is fixed. The pad-holder 12 is substantially rectangular in shape and has a first pair of sides 16 and 18 which are substantially parallel and circumferentially spaced. The pad-holder 12 also has a second pair of sides 20 and 22 which are substantially parallel and radially spaced. Each of the sides 16 and 18 has a projection, respectively 24 and 26, in which notches 28 and 30 respectively are formed. Each of these notches 28 and 30 is formed by a first part 32 substantially parallel to the side 22 and a second part 34 which forms an acute angle A with the first part 32. The distance between the apices of the two notches 28 and 30 is designated by D. The torque support of a brake intended to receive the pad 10 has also been partially represented in FIGS. 1 and 2. This torque support 36 has projections 38 and 40 with a profile conjugate with the profile of the notches 28 and 30, the projection 40 being formed by means of an axially removable key 42. As the pad 10 is able to slide axially by means of these notches 28 and 30 on the projections 38 and 40, working play of course exists between the notches of the pad 10 and the projections of the torque support 36. This working play J is defined between the apex of the pad notch and the apex of the torque support projection, this play J having a predetermined value, between two defined extreme values for correct fixing and sliding of the pad 10. The distance which exists between the projections 38 and 40 of the torque support is designated by R; the value of R equals D+J. With reference to FIG. 2, in which, for easier understanding, the friction material 14 has not been represented, it can be seen that the pad 10 has been turned in the direction of the arrow B about the projection 38. The pad 10 is in contact with the projection 38 at a point P of the second part 34 of the notch 28, this point P corresponding to the contact between the apex of the projection 38 and the second part 34, this point being defined by the angle of rotation of the pad 10 with respect to the torque support 36 and the length of the projection 24 which also bears on the projection 38. When a portion of a circle centered on P and having R for radius is traced from the point P, it can be seen that the side 18 of the pad 10 has two regions inside the circle of radius R. Given that R represents the distance between the projections 38 and 40 of the torque support 36, it will be understood that it is possible in these conditions to fit the pad either in the manner represented in FIG. 1 which is correct or in the manner represented in FIG. 2 which is not.

With reference to FIG. 3 in which the same elements have the same references, the portion of a circle of radius R centered on the point P only determines a single inner region of radius R which is part of the notch 30. The end of the part 34 of the notch 30, furthest from the apex of the notch, is connected to the side 18 by a straight portion 44 so inclined that the profile of the side 18 and of the straight portion 44 does not cut the circle of radius R. It is then impossible to fit the key 42 other than in the notch 30. As FIG. 3 shows, the key 42 and the side 18 have an interference region making fitting of said key 42 impossible.

The pad just described is fitted in the following way:

When the key 42 has been removed from the projection 40 formed on the torque support 36, the pad is presented along the arrow C (see FIG. 3) between the projections 38 and 40 of the torque support 36. The sides 16 and 18 are engaged between said projections. The pad 10 is then turned in the direction of the arrow B to make the projection 38 go into the notch 28, as represented in FIG. 3. The pad 10 is then turned in the opposite direction to the arrow B so that the notch 30 is opposite the projection 40.

During this turning, the point of contact P between the projection 38 and the pad 10 moves along the part 34 of the notch 28. As FIG. 3 shows, the key 42 can only be fitted when the notch 30 is opposite the projection 40; in practice, the profile of the side 18 prevents the key 42 being fitted, throughout rotation of the pad 10. When the notch 30 is in the proper position with respect to the projection 40, the key 42 is then fitted, being slid between the projection 40 and the pad 10 so as to take up its normal position as represented in FIG. 1. The pad 10 is then locked into the proper position on the torque support 36.

The invention thus clearly makes it impossible for someone unskilled to fit the disc brake pad incorrectly.

It is quite clear that the portions 44 must be straight, as represented in FIG. 3, or be of any shape which ensures a distance greater than the radius R between the point P and the side 18 of the pad. It can be seen that the invention also allows incorrect fitting to be avoided in the case of the projection 38 being badly positioned with respect to the notch 28, even if the projection 40 and the key 42 are correctly fitted in the notch 30. The invention is of course not limited to the embodiment just described and can be applied to any disc brake pad liable to be incorrectly fitted by someone unskilled.

We claim:

1. A disc brake pad including a pad-holder plate on which a friction pad is fixed and which can be mounted to support projections of a disc brake assembly and retained in the assembly by way of removable key means, comprising a substantially rectangular pad-holder plate having a first pair or sides which are substantially parallel and circumferentially spaced apart and a second pair of sides which are substantially parallel and radially spaced apart, each of the sides of the first pair having a notch therein comprising a first part substantially parallel to said sides of the second pair and a second part disposed at an acute angle with said first part characterized in that the profile of said sides of the first pair and the support projections provide for rotatable mounting of the pad and plate as the pad and plate are placed in operaable position between the support projections, in that at any point along the length of said second part the distance between said point and any point on the circumferentially opposide side of said first pair, other than the region of the associated notch, is greater than the distance separating the apices of the two notches plus a predetermined value, whereby the plate and friction pad are mounted to the support projections by engaging one notch with a support projection and rotating the plate thereabout so that the other notch receives the other suport projection prior to introduction of said removable key means into the other notch.

2. The disc brake pad according to claim 1, characterized in that each side of the first pair has a plate projection in which said notch is formed.

3. The disc brake pad and plate according to claim 2, characterized in that each of said plate projections has a plate end portion circumferentially disposed apart from the apex of the associated notch and connected to the associated side of said first pair of sides by means of a straight portion.

4. The disc brake pad and plate according to any one of the preceding claims, wherein a torque support includes the support projections which are circumferentially spaced apart for supporting said pad, characterized in that said support projections have a profile complementary with the profile of said notches and that the circumferential distance between the apices of the support projections corresponds to the distance separating the apices of the two notches plus said predetermined value.

5. The disc brake pad and plate according to claim 4, characterized in that the other of said support projections of said torque support is shaped complementary to said removable key means which is axially removable.

* * * * *